United States Patent
Li et al.

(10) Patent No.: US 10,375,621 B2
(45) Date of Patent: Aug. 6, 2019

(54) CLUSTER-BASED BEACON SIGNAL TRANSMISSION

(71) Applicant: Telefonaktiebolaget LM Ericsson (publ), Stockholm (SE)

(72) Inventors: Gen Li, Beijing (CN); Qingyu Miao, Beijing (CN); Virgile Garcia, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 130 days.

(21) Appl. No.: 15/316,491

(22) PCT Filed: Jun. 6, 2014

(86) PCT No.: PCT/CN2014/079325
§ 371 (c)(1),
(2) Date: Dec. 5, 2016

(87) PCT Pub. No.: WO2015/184630
PCT Pub. Date: Dec. 10, 2015

(65) Prior Publication Data
US 2017/0150419 A1  May 25, 2017

(51) Int. Cl.
*H04W 40/24* (2009.01)
*H04W 16/28* (2009.01)
(Continued)

(52) U.S. Cl.
CPC .......... *H04W 40/244* (2013.01); *H04B 7/024* (2013.01); *H04B 7/0617* (2013.01);
(Continued)

(58) Field of Classification Search
CPC .... H04W 16/28; H04W 40/244; H04W 48/10
See application file for complete search history.

(56) References Cited

U.S. PATENT DOCUMENTS

2003/0204623 A1  10/2003  Cain
2006/0092881 A1*  5/2006  Laroia ................. H04B 1/7097
370/331
(Continued)

FOREIGN PATENT DOCUMENTS

CN     103167586 A    6/2013
JP     2008512954 A   4/2008
(Continued)

OTHER PUBLICATIONS

Examination Report from foreign counterpart Singapore Patent Application No. 11201609504Y, dated Aug. 29, 2017, 5 pages.
(Continued)

*Primary Examiner* — Gbemileke J Onamuti
(74) *Attorney, Agent, or Firm* — NDWE LLP

(57) ABSTRACT

A method in an access point (AP) for broadcasting a beacon signal in a high frequency radio communication network. The method entails joining an AP cluster in the high frequency radio communication network, wherein the AP cluster contains two or more APs, and broadcasting a same beacon signal together with other APs in the AP cluster synchronously. The broadcasted same beacon signal contains an identification of the AP cluster. Also provided is a method in a communication device for deriving a beacon signal in a high frequency radio communication network.

26 Claims, 6 Drawing Sheets

(51) Int. Cl.
*H04W 48/10* (2009.01)
*H04B 7/06* (2006.01)
*H04B 7/024* (2017.01)
*H04W 88/08* (2009.01)

(52) U.S. Cl.
CPC ........... *H04W 16/28* (2013.01); *H04W 48/10* (2013.01); *H04W 88/08* (2013.01)

(56) References Cited

U.S. PATENT DOCUMENTS

| | | |
|---|---|---|
| 2012/0026941 A1 | 2/2012 | Ahmad et al. |
| 2012/0026987 A1 | 2/2012 | Jain et al. |
| 2014/0064128 A1 | 3/2014 | Park et al. |

FOREIGN PATENT DOCUMENTS

| | | | |
|---|---|---|---|
| JP | 2009260967 A | 11/2009 | |
| JP | 2010154520 A | 7/2010 | |
| JP | 2011514761 A | 5/2011 | |
| JP | 2012175592 A | 9/2012 | |
| JP | 2012523189 A | 9/2012 | |
| JP | 2012524459 A | 10/2012 | |
| JP | 2013519305 A | 5/2013 | |
| KR | 20120096520 A | 8/2012 | |
| KR | 20130107798 A | 10/2013 | |
| RU | 2461991 C2 | 9/2012 | |
| WO | 2012039652 A1 | 3/2012 | |
| WO | 2013048212 A2 | 4/2013 | |
| WO | 2013174428 A1 | 11/2013 | |
| WO | 2014009250 A1 | 1/2014 | |

OTHER PUBLICATIONS

First Examination Report from foreign counterpart Australian Patent Application No. AU2014396695, dated Aug. 11, 2017, 2 pages.
Office Action from foreign counterpart Canadian Patent Application No. CA2951298, dated Oct. 13, 2017, 4 pages.
Notification of Transmittal of the International Search Report and the Written Opinion for Application No. PCT/CN2014/079325, dated Mar. 3, 2015, 12 pages.
Pål Frenger et al., "A New Clean Slate System Architecture, Progress report on the evaluation of candidate energy efficient radio transmission paradigms," May 31, 2013, 34 pages, Towards Green 5G Mobile Networks (5GrEEn), Version 0.1.
Notification Concerning Transmittal of International Preliminary Report on Patentability for Application No. PCT/CN2014/079325, dated Dec. 15, 2016, 6 pages.
Office Action and Search Report from foreign counterpart Russian Patent Application No. 2016151192, dated Feb. 1, 2018, 13 pages. (Translation available only for office action).
Office Action from foreign counterpart Japanese Patent Application No. 2016-570030, dated Feb. 9, 2018, 11 pages.
Extended European Search Report for Application No. 14893879.8, dated Dec. 6, 2017, 7 pages.
Notice of Allowance from foreign counterpart Korean Patent Application No. 10-2016-7034126, dated Nov. 20, 2017, 5 pages.
First Office Action from foreign counterpart Mexican Patent Application No. MX/a/2016/015756, dated Apr. 30, 2018, 4 pages.
Decision to Grant a Patent from foreign counterpart Japanese Patent Application No. 2016-570030, dated Aug. 31, 2018, 6 pages.
Office Action and Search Report from foreign counterpart Canadian Patent Application No. 2951298, dated Oct. 3, 2018, 4 pages.
Office Action from foreign counterpart Russian Patent Application No. 2016151192, dated Sep. 27, 2018, 7 pages.
Office Action from foreign counterpart Israel Patent Application No. 249049, dated Dec. 2, 2018, 3 pages.
Communication pursuant to Article 94(3) EPC from foreign counterpart European Patent Application No. 14893879.8, dated Jan. 2, 2019, 6 pages.
Decision to Grant a Patent from foreign counterpart Russian Patent Application No. 2016151192, dated Feb. 25, 2019, 20 pages.
First Office Action and Search Report from foreign counterpart Chinese Patent Application No. 201480079600.X, dated Mar. 26, 2019, 14 pages.

\* cited by examiner

CLUSTER-BASED BEACON SIGNAL TRANSMISSION

CROSS-REFERENCE TO RELATED APPLICATIONS

This application is a National stage of International Application No. PCT/CN2014/079325, filed Jun. 6, 2014, which is hereby incorporated by reference.

TECHNICAL FIELD

The present technology relates to the field of communication, particularly to a method of broadcasting a beacon signal based on access point clusters in a high frequency radio communication network. The technology also relates to an access point and a computer readable storage medium for performing the method.

BACKGROUND

Millimeter-wave (MMW) wireless systems, operating from 30-300 GHz, are emerging as a promising technology for meeting the exploding bandwidth requirements by enabling multi-Gbps speeds. For example, the 5G-oriented ultra-dense networks (UDN) will be most probably deployed in MMW band. A typical deployment for UDN is in highly populated areas such as hot spots, office building, or downtown area at cities where there are demands of high data rate service. At such high transmission frequency (e.g. ≥6 GHz), the path loss becomes much higher than that at low transmission frequency. In operation, the beacon signal containing the information such as synchronization information and random access configuration need to be broadcasted to a large enough coverage area by an access point (AP) such that all user equipments (UEs) served can receive it correctly.

FIG. 1 illustrates the individual broadcasting coverage areas by an AP when employing different antenna configurations.

Due to the high path loss, the broadcasting coverage by using omni or quasi-omni directional antenna is a very small coverage. As shown, the smallest circle indicates the broadcasting coverage using omni-antenna with normal modulation and coding rate. The middle circle indicates the broadcasting coverage using omni-antenna with low modulation and coding rate. Lowering modulation and coding rate may help enlarge the broadcasting coverage a bit, which however is not enough to accomplish the seamless coverage. As illustrated in FIG. 2, there still exist edge areas between APs that can not be covered by the enlarged broadcasting coverage.

The largest circle indicates the broadcasting coverage using beamforming antennas, whereby the high gain beamforming are enabled. In this way, the broadcasting coverage is enlarged a lot. Typically, the beacon signal will be broadcasted by beacon sweeping, which means that the AP transmits a same beacon signal over a plurality of beams directed to different directions one after another. However, since all the beamforming antennas are required to broadcast the beacon signal periodically, the antenna power consumption is notable. Furthermore, the cell-edge UEs may receive different beacon signals from different APs, which cause interference in receiving these beacon signals at the UEs.

SUMMARY

It's an object of the present invention to resolve or alleviate at least one of the problems mentioned above.

A first aspect of an invention disclosed herein is a method in an AP for broadcasting a beacon signal in a high frequency radio communication network. The method comprises joining an AP cluster in the high frequency radio communication network, the AP cluster contains two or more APs; and broadcasting a same beacon signal together with other APs in the AP cluster synchronously, the broadcasted same beacon signal contains an identification of the AP cluster.

A second aspect of the invention is a computer readable storage medium storing instructions which, when run on an AP, cause the AP to perform the steps of the method as described above.

A third aspect of the invention is a method in a communication device for deriving a beacon signal in a high frequency radio communication network. The method comprises receiving a plurality of candidate beacon signals from one or more AP clusters, each of the one or more AP clusters comprises a plurality of APs, the plurality of APs within a same AP cluster broadcast a same beacon signal synchronously, and each of the plurality of candidate beacon signals contains an identification of an associated AP cluster; and selecting one or more beacon signals from the plurality of candidate beacon signals.

A fourth aspect of the invention is a computer readable storage medium storing instructions which, when run on an communication device, cause the communication device to perform the steps of the method as described above.

A fifth aspect of the invention is an AP configured to broadcast a beacon signal in a high frequency radio communication network. The AP comprises a jointing unit and a broadcasting unit. The jointing unit is adapted to join an AP cluster in the high frequency radio communication network, the AP cluster containing two or more APs. The broadcasting unit is adapted to broadcast a same beacon signal together with other APs in the AP cluster synchronously; the broadcasted same beacon signal contains an identification of the AP cluster.

A sixth aspect of the invention is a communication device configured to derive a beacon signal in a high frequency radio communication network. The communication device comprises a receiving unit and a selecting unit. The receiving unit is adapted to receive a plurality of candidate beacon signals from one or more AP clusters, each of the one or more AP clusters comprises a plurality of APs, the plurality of APs within a same AP cluster broadcast a same beacon signal synchronously, and each of the plurality of candidate beacon signals contains an identification of an associated AP cluster. The selecting unit is adapted to select one or more beacon signals from the plurality of candidate beacon signals.

A seventh aspect of the invention is an AP configured to broadcast a beacon signal in a high frequency radio communication network. The AP comprises a processor and a memory. The memory contains instructions executable by the processor whereby the AP is operative to join an AP cluster in the high frequency radio communication network, the AP cluster containing two or more APs; and to broadcast a same beacon signal together with other APs in the AP cluster synchronously, the broadcasted same beacon signal contains an identification of the AP cluster.

An eighth aspect of the invention is a communication device configured to derive a beacon signal in a high frequency radio communication network. The communication device comprises a processor and a memory. The memory contains instructions executable by the processor whereby the communication device is operative to receive a plurality of candidate beacon signals from one or more AP clusters, each of the one or more AP clusters comprises a plurality of APs, the plurality of APs within a same AP cluster broadcast a same beacon signal synchronously, and each of the plurality of candidate beacon signals contains an identification of an associated AP cluster; and to select one or more beacon signals from the plurality of candidate beacon signals.

By clustering several APs into a AP cluster, the APs in a same AP cluster join together to broadcast a same beacon signal synchronously, thereby obtaining the energy gain and/or diversity gain for this beacon signal at reception side. Accordingly, the beacon broadcasting coverage will be enlarged.

BRIEF DESCRIPTION OF THE DRAWINGS

The technology will be described, by way of example, based on embodiments with reference to the accompanying drawings, wherein.

DETAILED DESCRIPTION

Figure 1:
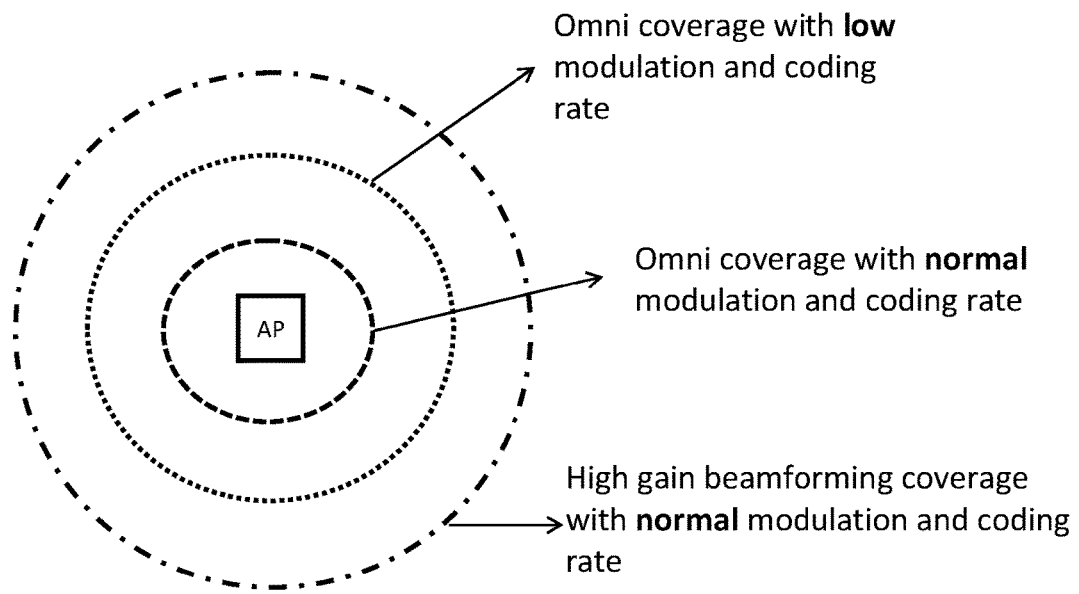
FIG. 1 schematically illustrates the beacon broadcasting coverage areas by a AP employing different antenna configurations.
Figure 2:
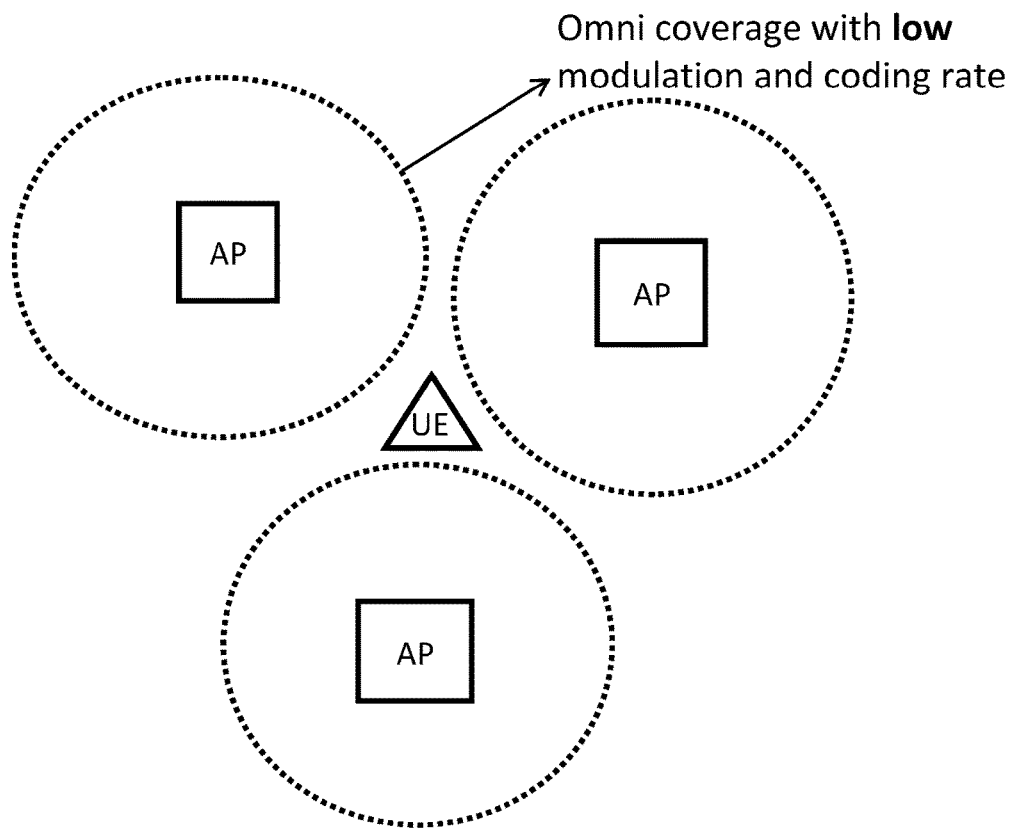
FIG. 2 schematically illustrates the beacon broadcasting coverage by multiple APs using omni-antenna with low modulation and coding rate.

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Although specific terms in some specifications are used here, such as AP, it should be understood that the embodiments are not limited to those specific terms but may be applied to all similar entities, such as base station, macro base station, femto base stations, Core Network (CN), NodeB, eNodeB etc.

Embodiments herein will be described below with reference to the drawings.

Figure 3:
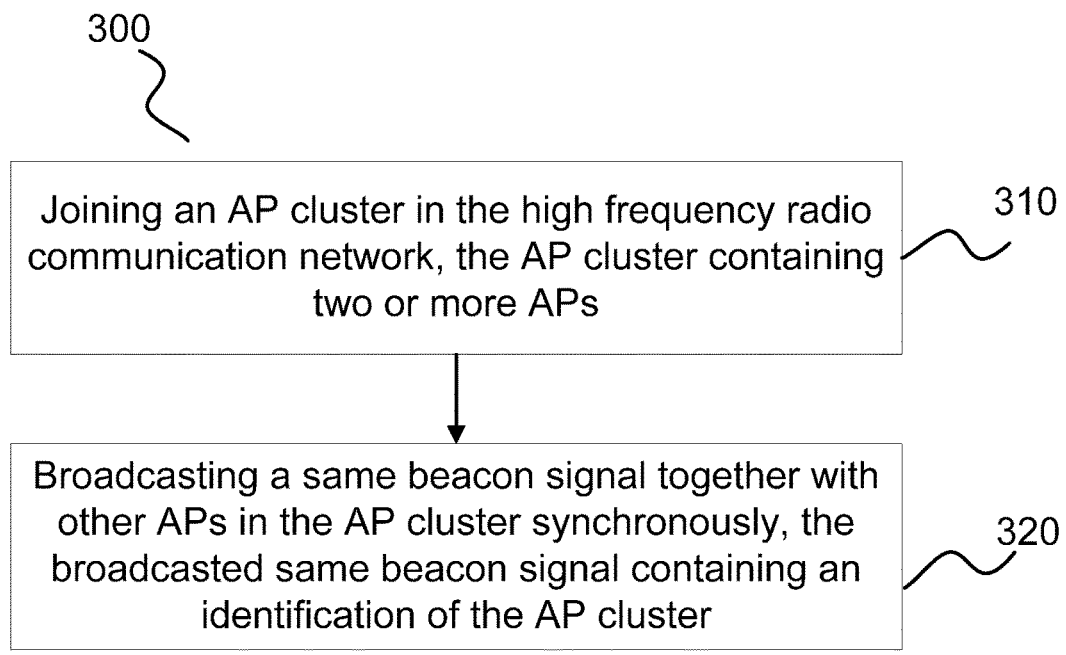
FIG. 3 schematically illustrates a flowchart of broadcasting a beacon signal by an AP in a high frequency radio communication network in accordance with an embodiment.

FIG. 3 schematically illustrates a method 300 of broadcasting a beacon signal by an AP in a high frequency radio communication network in accordance with an embodiment. Here, the high frequency radio communication network usually refers to any kind of radio communication network operating on the transmission frequency over 6 GHz such as the UDN. Now the process of the embodiment will be described in detail with reference to the FIG. 3.

In step 310, the AP joins an AP cluster in the high frequency radio communication network. The AP cluster contains two or more APs.

Specifically, it can be statically predefined which AP cluster the AP should join in the process of cell planning. In an embodiment, there is a central controller in the high frequency radio communication network, all APs send information on their position or signal reception power of the signals received from neighboring APs to the central controller. Then the central controller will divide all APs into multiple clusters based on the collected information. For example, according to the position information of the APs, the APs having a shorter distance from each other will join a same cluster. For another example, the central controller may include the APs whose signal reception power from each other being over a power threshold into a same cluster.

Alternatively, the AP may dynamically choose the AP cluster that it is intended to join in operation. For example, when an AP is just starting up or wants to change into another cluster, it may firstly obtain the cluster information around by detecting the beacon signals broadcasted by the clusters or request neighboring APs for this information, and then determine to join which one of the available AP clusters based on some criteria. In an embodiment, the AP may join the AP cluster whose distance from the AP is shorter than a threshold distance. In other words, the AP will join the neighboring AP cluster. In another embodiment, the AP may join the AP cluster whose overlapping coverage with the AP is larger than a threshold area. In a further embodiment, if, for example, the number of the APs in the AP cluster that the AP is intended to join has reached the upper limit, the AP may create a new AP cluster and join the new cluster. Subsequently, other APs may choose to join this new cluster.

It should be appreciated that the above joining the AP cluster simply are described by way of example, and other suitable ways to join the AP cluster can be applied to the present invention.

In step 320, the AP broadcasts a same beacon signal together with other APs in the AP cluster synchronously. Here, a beacon signal refers to a controlling signaling transmitted by broadcasting. The beacon signal may contain synchronization information, one or multiple preambles for control or data signal detection, beam training preamble, reference signal, random access configuration, indicator of downlink and uplink configuration, bandwidth indicator and the like, or combination thereof. In the present disclosure, the beacon signal further contains an identification of the AP cluster.

Specifically, the APs in the same AP cluster may broadcast the same beacon signal synchronously. That is, each of the APs broadcast a beacon signal simultaneously with each other, and the respective beacon signals broadcasted by the APs are the same beacon signal. The same beacon signal means that all the items, such as synchronization information and the identification of the AP cluster, contained in these beacon signals are identical to each other. In this way, it is very likely that the beacon signal receiver such as a mobile phone will receive a clustered beacon signal which is a superposition of more than one of these same beacon signals. Hence, the energy gain will be obtained at the reception side. Additionally, the APs may coordinate a joint transmission to, for example, precode these same beacon signals before broadcasting them. As such, the diversity gain will be obtained at the reception side.

In an embodiment, each AP in the AP cluster may employ omni antenna to broadcast beacon signals. In this case, these APs may consistently lower the modulation and coding rate for the beacon signals to be broadcasted so as to achieve a further broader broadcasting coverage.

In another embodiment, each AP in the AP cluster may employ beamforming antenna to broadcast beacon signals. In particular, each AP in the AP cluster has a plurality of beams directed to different directions, and the AP may broadcast the beacon signal in different directions over the plurality of beams. In this way, the high gain in the transmission over beams is obtained. Note that the beamforming technology is known in the art, which therefore will not be described in detail for simplicity and clarity.

Figure 4:
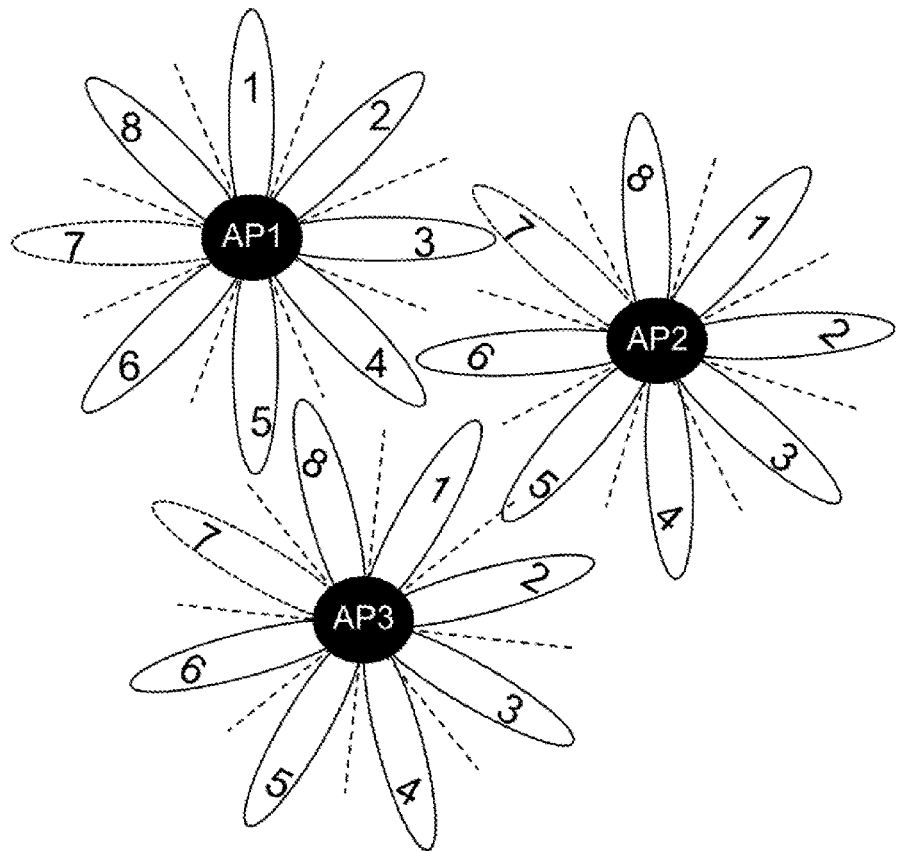
FIG. 4 schematically illustrates an AP cluster, in which all the APs employ the beamforming antenna to broadcast the beacon signal over a plurality of beams in accordance with an embodiment.

Further, in the case that each AP in the AP cluster employs beamforming antenna to broadcast beacon signals, these APs may broadcast the same beacon signal synchronously over their beams having same beam identification. For example, as illustrated in FIG. 4, the AP cluster has three APs, AP1-AP3, each of which totally has 8 beams, which are sequentially numbered as beam 1-beam 8. It should be understood that the beams may also be numbered non-sequentially. When performing the clustered beacon transmission, the three APs will synchronously broadcast the same beacon signal over their beams with the same beam identification, such as the three beams with number of beam 1 of the AP1-AP3. In addition, in order to identify the beacon signals transmitted over different beams in one AP, the broadcasted beacon signal may additionally contain the beam identification for the associated beam and the optional configuration information associated with the beam, e.g. the random access resource configuration specific to the beam.

Moreover, in order that the receiver can receive the clustered beacon signal so as to obtain the additional energy/diversity gain, it is desirable that the beams having the same beam identification in the APs are directed to a substantially same direction. Here, the substantially same direction may represent the same direction and the direction with the angle smaller than a threshold. In this way, the beams having the same beam identification in different APs will have overlapping coverage, which makes it possible for the receiver to receive the same beacon signals from the two or more of the beams which same beacon signals overlay each other to form the clustered beacon signal By clustering several APs into a AP cluster, the APs in a same AP cluster join together to broadcast a same beacon signal synchronously, thereby obtaining the energy gain and/or diversity gain for this beacon signal at reception side. Accordingly, the beacon broadcasting coverage will be enlarged.

Figure 5A:
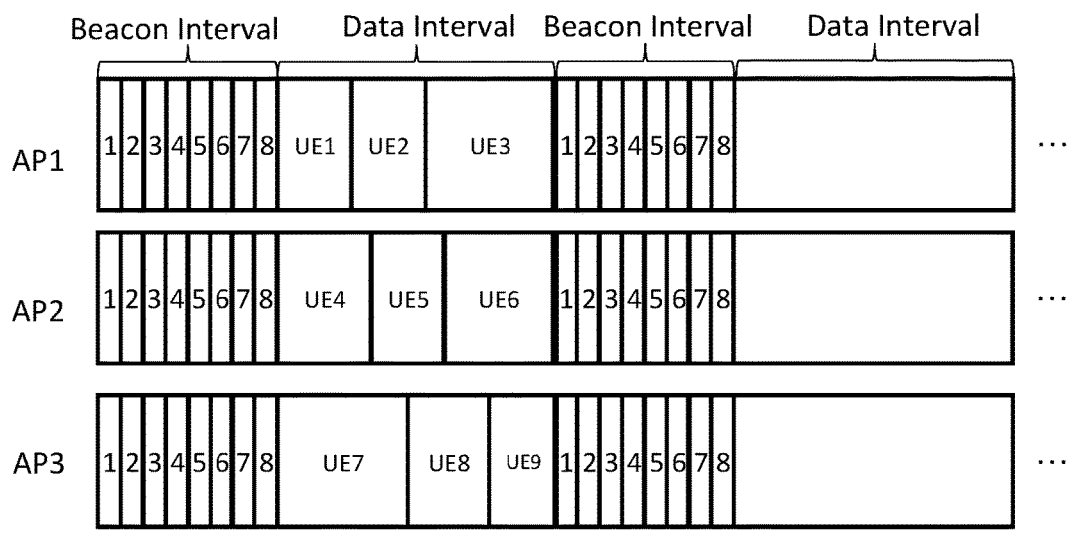
FIG. 5a-b schematically illustrates the clustered beacon transmission in accordance with an embodiment.

Optionally, for each AP in the AP cluster broadcasts, all beams of the AP are utilized to broadcast beacon signals within a single beacon transmission interval. As illustrated in FIG. 5a, the beacon transmission intervals are arranged periodically. Each beacon transmission interval is divided into 8 time slots, which are used by the AP1-AP3 to synchronously broadcast the same beacon signal over each of all the 8 beams. For example, within the time slot 1, the AP1-AP3 utilizes their beams with the identification of beam 1 to synchronously broadcast a same beacon signal; within the time slot 2, they utilizes their beams with the identification of beam 2 to synchronously broadcast a same beacon signal; and so on. Finally, all the beams in each AP have been utilized to broadcast beacon signals within one beacon transmission interval. Here, the beacon signals broadcasted by the APs over the beams having the same beam identification are the same beacon signal. In addition, the beacon signals broadcasted by the APs over the beams having different beam identifications can also be deemed as the same beacon signal, if the only difference is the contained beacon identification.

Figure 5B:
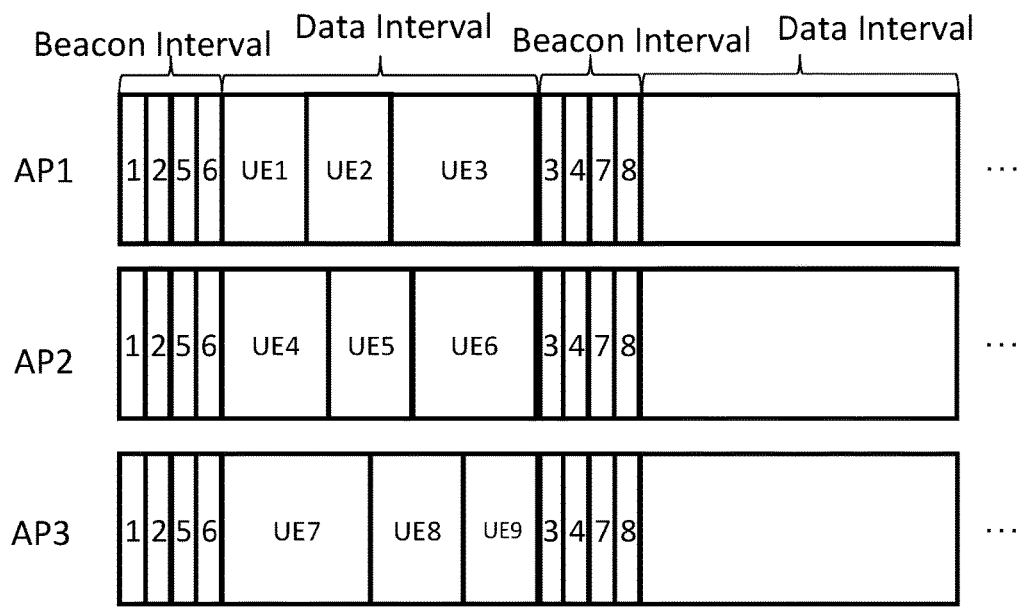

Alternatively, in order to alleviate the burden for the APs to broadcast the beacon signals thereby saving overhead and power consumption, it is advantageous that a first subset of all beams of the AP are utilized to broadcast beacon signals within a first beacon transmission interval, and a second subset of all beams of the AP are utilized to broadcast beacon signals within a second beacon transmission interval. In this way, the number of beacon signals broadcasted by the AP within each beacon transmission interval will be reduced. For example, as illustrated in FIG. 5b, the first beacon transmission interval is divided into four time slots, which are used by the AP1-AP3 to synchronously broadcast a same beacon signal over each beam of four beams, i.e. beam 1, beam 2, beam 5 and beam 6. The second beacon transmission interval is divided into four time slots, which are used by the AP1-AP3 to synchronously broadcast a same beacon signal over each beam of other four beams, i.e. beam 3, beam 4, beam 7 and beam 8. Here, the beams are divided into two subsets for beacon transmission in different beacon transmission intervals by way of example; it should be appreciated that the beams may be divided into two or more subsets such that each subset is utilized to broadcast beacon signals in different beacon transmission intervals.

Figure 6:
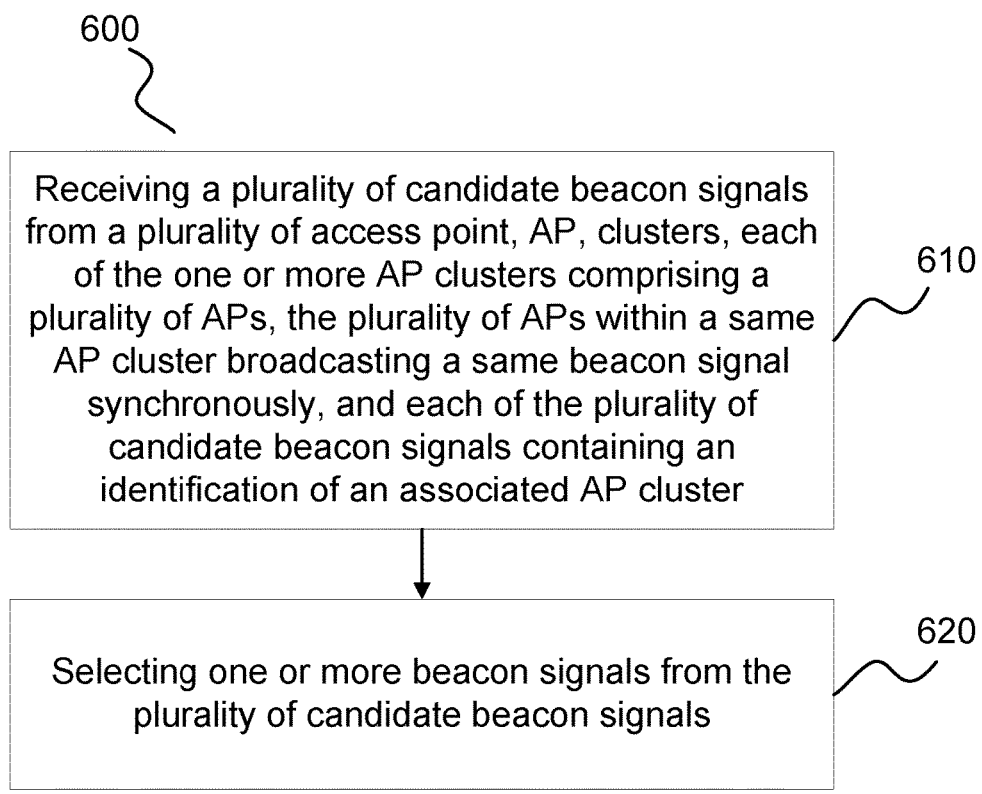
FIG. 6 schematically illustrates a flowchart of deriving a beacon signal by a communication device in a high frequency radio communication network in accordance with an embodiment.

FIG. 6 schematically illustrates a method 600 of deriving a beacon signal by a communication device in a high frequency radio communication network in accordance with an embodiment. Here, the communication device may be any device intended for accessing services via a radio communication network and configured to communicate over the radio communication network. For instance, the communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or personal computer (PC). The communication device may be a portable, pocket-storable, hand-held, computer-comprised, or vehicle-mounted mobile device, enabled to communicate voice and/or data, via a wireless connection. Now the process of the embodiment will be described in detail with reference to the FIG. 6.

In step 610, the communication device receives a plurality of candidate beacon signals transmitted from one or more AP clusters. As described above, each of the one or more AP clusters comprises a plurality of APs, the plurality of APs within a same AP cluster broadcast a same beacon signal synchronously, and each of the plurality of candidate beacon signals contains an identification of an associated AP cluster. Since the APs in one AP cluster broadcast a same beacon signal synchronously, these same beacon signals broadcasted by the APs will overlay each other during propagation to form an overlaid beacon signal, also referred to as clustered beacon signal. The clustered beacon signal is received by the communication device as the candidate beacon signal transmitted from this AP cluster. In the same way, the communication device may receive respective candidate beacon signals transmitted from other AP clusters.

In step 620, the communication device selects one or more beacon signals from the plurality of candidate beacon signals. In an embodiment, the communication device may select the one or more beacon signals based on the reception quality of the plurality of candidate beacon signals. For example, the communication device may check the signal strength of the candidate beacon signals. The stronger the signal strength is, the better the reception quality is. In this way, the communication device may select a beacon signal with the highest reception quality. Then, the communication device will send the random access request to the AP cluster having broadcasted this selected beacon signal. For example, the communication device may retrieve the identification of the AP cluster and random access configuration information specific to this AP cluster, create a random access request based on the random access configuration information which may contain the format of the random access request, for example, the random access request is required to contain the identification of the AP cluster, and then send the random access request to the AP cluster, more specifically the APs of the AP cluster, using the scheduled time-frequency resource as indicated in the random access configuration information.

In addition, it is likely that the AP cluster having broadcasted the selected beacon signal doesn't respond to the communication device's access request (for example, all the APs in the AP cluster shut down). In this case, the communication device may select more than one beacon signals from the candidate beacon signals, and then send the random access request to the different sources having broadcasted the selected more than one beacon signals.

Since the clustered beacon signal transmitted from the AP cluster may provide the energy gain and/or diversity gain for the communication device, the communication device is able to obtain the beacon signal with higher quality, thereby smoothly setting up the communication connection with the APs.

Furthermore, all the APs in the plurality of AP clusters may employ the beamforming antenna to broadcast the beacon signal over beams directed to different directions. In this case, each of the plurality of APs within a same AP cluster has a plurality of beams, a same beacon signal is broadcast synchronously by the plurality of APs within the same AP cluster over their beams having a same beam identification, and each of the plurality of candidate beacon signals further contains an identification the beam utilized to transmitting the candidate beacon signals. As such, an AP cluster may broadcast different candidate beacon signals through different beams, these candidate beacon signals have the same AP cluster identification, but different beam identification. For example, the communication may receive two candidate beacon signals. The first candidate beacon signal is transmitted from the AP cluster 1 through the beam 1, the second candidate beacon signal is transmitted from the AP cluster 1 through the beam 2.

Due to the introduction of the beams, the random access request will be directed to the specific beam of the AP cluster instead of the AP cluster. In an embodiment, the communication device may retrieve the identification of the AP cluster, the identification of the beam, and random access configuration information specific to the beam of the AP cluster, then create a random access request based on the random access configuration information, the random access request may contain the identification of the AP cluster and the identification of the beam, and finally send the random access request directed to a specific beam to the AP cluster.

Figure 7:
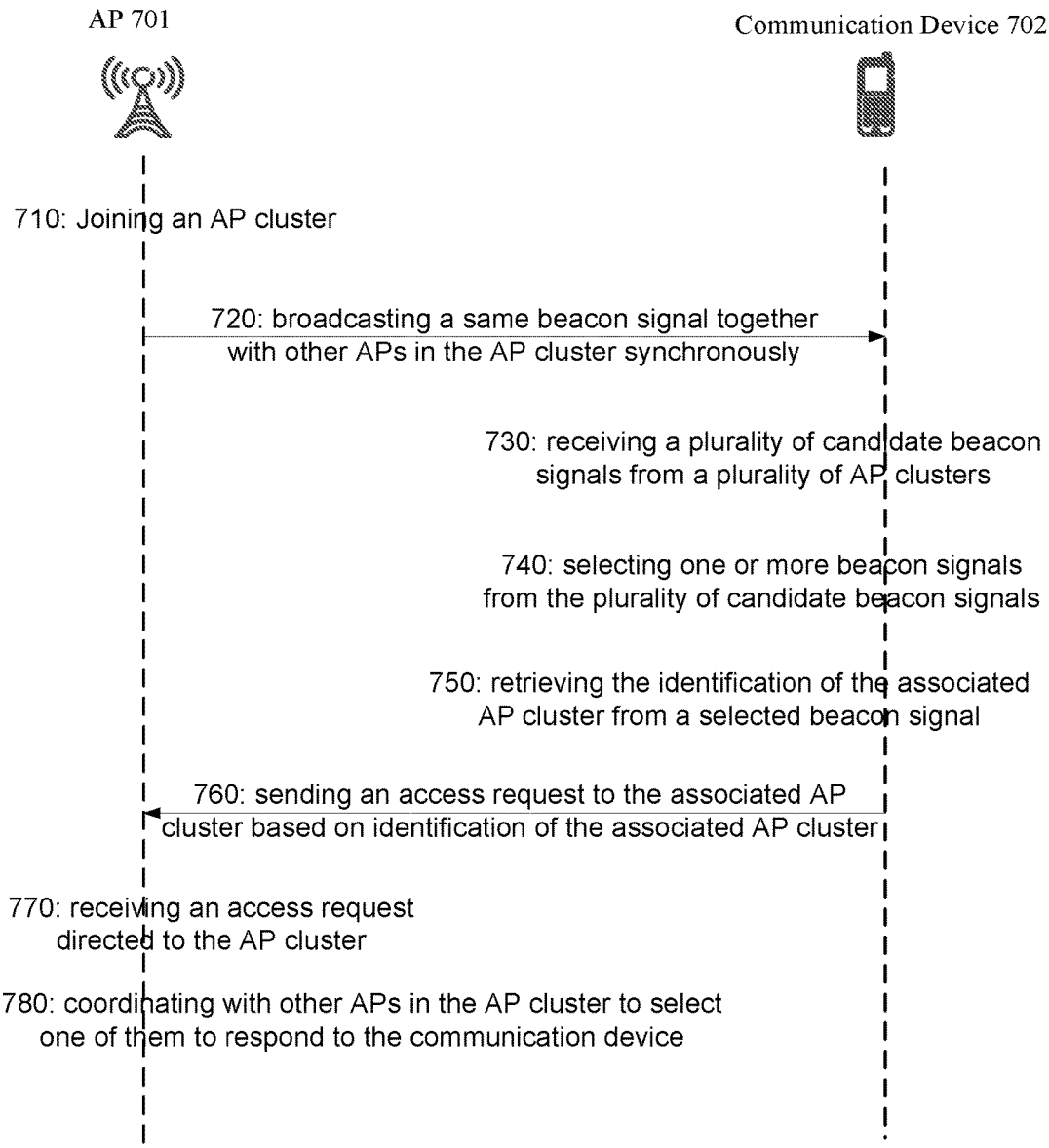
FIG. 7 schematically illustrates an interaction diagram between the AP in a AP cluster and the communication device in accordance with an embodiment.

FIG. 7 schematically illustrates an interaction diagram between the AP 701 in a AP cluster and the communication device 702 in accordance with an embodiment. Now the interaction between the communication and the AP cluster will be set forth with reference to the FIG. 7.

The AP 701 joins an AP cluster in the high frequency radio communication network at 710, and broadcast a same beacon signal together with other APs in the AP cluster synchronously at 720. The steps 710 and 720 are performed in the same way as in steps 310 and 320 in FIG. 3, and hence will not be repeated for purpose of brevity.

After the APs (including AP 701) in the AP cluster broadcast the same beacon signal synchronously, the communication device 702 may, at 730, receive a plurality of candidate beacon signals from a plurality of AP clusters including the AP cluster that the AP 701 joins, and select one or more beacon signals from the plurality of candidate beacon signals at 740. The steps 730 and 740 are performed in the same way as in steps 610 and 620 in FIG. 6, and hence will not be repeated for purpose of brevity.

Provided that the communication device 702 select the beacon signal transmitted from the AP cluster that the AP 701 joins, the communication device 702 may retrieve the identification of this AP cluster from the selected beacon signal at 750, and send an access request containing the identification of the AP cluster to the AP cluster at 760.

The AP 701 and other APs in the AP cluster monitor the access request sent from the communication device and determine whether the access request is directed to this AP cluster by checking the AP cluster identification in the access request. If it is determined that the access request is directed to this AP cluster, the AP 701 and other APs in the AP cluster may receive the access request directed to the AP cluster at 770 and coordinate with the other APs in the AP cluster to select one of them to respond to the communication device 701 at 780. For example, the AP that has received the signal containing the access request with the best signal quality will be selected to respond to the communication device 701.

Figure 8:
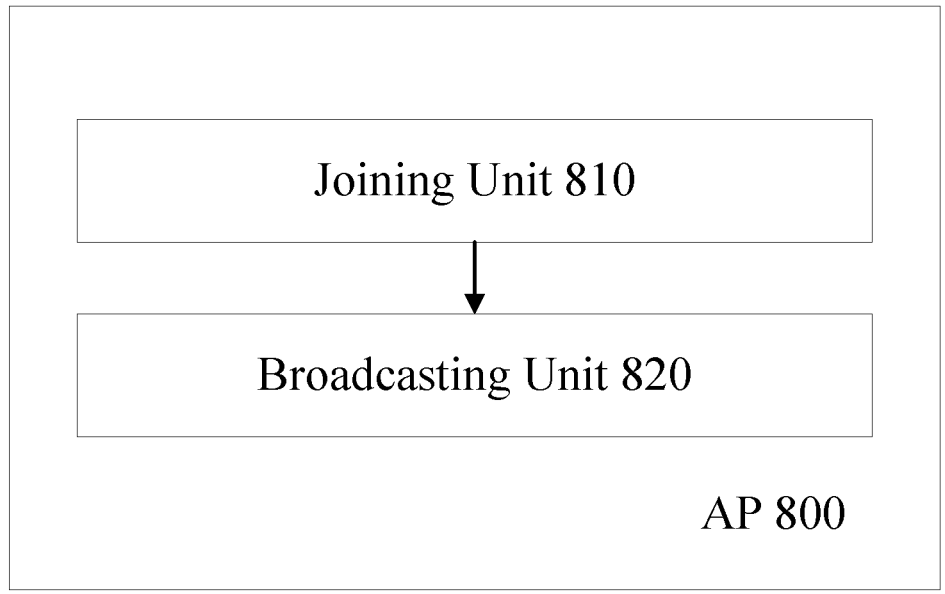
FIG. 8 is a block diagram of an exemplifying AP configured to broadcast a beacon signal in a high frequency radio communication network in accordance with an embodiment.

FIG. 8 is a block diagram of an exemplifying AP 800 configured to broadcast a beacon signal in a high frequency radio communication network in accordance with an embodiment. As shown, the AP 800 comprises a joining unit 810 and a broadcasting unit 820. It should be appreciated that the AP is not limited by the shown elements, and can comprise other conventional elements and additional elements for other purposes. Now the functions of these elements will be described in detail with reference to FIG. 8.

The joining unit 810 of the AP 800 joins an AP cluster in the high frequency radio communication network. The AP cluster contains two or more APs.

Specifically, it can be statically predefined which AP cluster the AP should join in the process of cell planning. In an embodiment, there is a central controller in the high frequency radio communication network, all APs send information on their position or signal reception power of the signals received from neighboring APs to the central controller. Then the central controller will divide all APs into multiple clusters based on the collected information. For example, according to the position information of the APs, the APs having a shorter distance from each other will join a same cluster. For another example, the central controller may include the APs whose signal reception power from each other being over a power threshold into a same cluster.

Alternatively, the joining unit 810 may dynamically choose the AP cluster that it is intended to join in operation. For example, when an AP is just starting up or wants to change into another cluster, the joining unit 810 may firstly obtain the cluster information around by detecting the beacon signals broadcasted by the clusters or request neighboring APs for this information, and then determine to join which one of the available AP clusters based on some criteria. In an embodiment, joining unit 810 may choose to join the AP cluster whose distance from the AP is shorter than a threshold distance. In other words, the joining unit 810 may choose to join the neighboring AP cluster. In another embodiment, the joining unit 810 may choose to join the AP cluster whose overlapping coverage with the AP is larger than a threshold area. In a further embodiment, if, for example, the number of the APs in the AP cluster that the joining unit 810 is intended to join has reached the upper limit, the joining unit 810 may create a new AP cluster and join the new cluster.

The broadcasting unit 820 of the AP 800 broadcasts a same beacon signal together with other APs in the AP cluster synchronously. Specifically, the broadcasting units 820 of the APs in the same AP cluster may broadcast the same beacon signal synchronously. That is, each of the APs broadcast a beacon signal simultaneously with each other, and the respective beacon signals broadcast by the APs are the same beacon signal. The same beacon signal means that all the items, such as synchronization information and the identification of the AP cluster, contained in these beacon signals are identical to each other. In this way, it is very likely that the beacon signal receiver such as a mobile phone will receive a clustered beacon signal which is a superposition of more than one of these same beacon signals. Hence, the energy gain will be obtained at the reception side. Additionally, the broadcasting units 820 of the APs may coordinate a joint transmission to precode these same beacon signals before broadcasting them. As such, the diversity gain will be obtained at the reception side.

In an embodiment, each AP in the AP cluster may employ omni antenna to broadcast beacon signals. In this case, the broadcasting units 820 of these APs may consistently lower the modulation and coding rate for the beacon signals to be broadcasted so as to achieve a further broader broadcasting coverage.

In another embodiment, each AP in the AP cluster may employ beamforming antenna to broadcast beacon signals. In particular, each AP in the AP cluster has a plurality of beams directed to different directions, and the AP may broadcast the beacon signal in different directions over the plurality of beams. In this way, the high gain in the transmission over beams is obtained. Note that the beamforming technology is known in the art, which therefore will not be described in detail for simplicity and clarity.

Further, in the case that each AP in the AP cluster employ beamforming antenna to broadcast beacon signals, the broadcasting units 820 of these APs may broadcast the same beacon signal synchronously over their beams having same beam identification. For example, as illustrated in FIG. 4, the AP cluster has three APs, AP1-AP3, each of which has 8 beams, which are sequentially numbered as beam 1-beam 8. When performing the clustered beacon transmission, the broadcasting units 820 of the three APs will synchronously broadcast the same beacon signal over their beams with the same beam identification, such as the three beams with number of beam 1 of the AP1-AP3. In addition, in order to identify the beacon signals transmitted over different beams in one AP, the broadcasted beacon signal may additionally contain the beam identification for the associated beam and the optional configuration information associated with the beam, e.g. the random access resource configuration specific to the beam.

Moreover, in order that the receiver can receive the same beacon signal from more than one AP so as to obtain the additional energy/diversity diversity gain, it is desirable that the beams having the same beam identification in the APs are directed to a substantially same direction. Here, the substantially same direction represents the same direction or the direction with the angle smaller than a threshold. In this way, the beams having the same beam identification in different APs will have overlapping coverage, which makes it possible for the receiver to receive the same beacon signal from the two or more of the beams.

Figure 9:
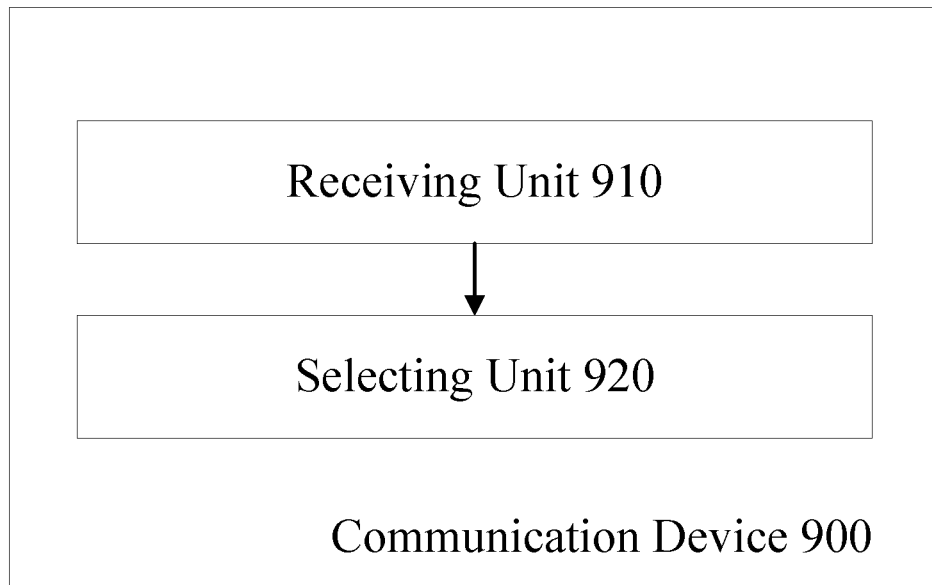
FIG. 9 is a block diagram of an exemplifying communication device configured to derive a beacon signal in a high frequency radio communication network in accordance with an embodiment.

FIG. 9 is a block diagram of an exemplifying communication device 900 configured to derive a beacon signal in a high frequency radio communication network in accordance with an embodiment. As shown, the communication device 900 comprises a receiving unit 910 and a selecting unit 920. In practice, the communication device may act as an UE or an AP. It should be appreciated that the communication device is not limited by the shown elements, and can comprise other conventional elements and additional elements for other purposes. Now the functions of these elements will be described in detail with reference to FIG. 9.

The receiving unit 910 of the communication device 900 receives a plurality of candidate beacon signals transmitted from one or more AP clusters. Each of the one or more AP clusters comprises a plurality of APs, the plurality of APs within a same AP cluster broadcast a same beacon signal synchronously, and each of the plurality of candidate beacon signals contains an identification of an associated AP cluster. Since the APs in one AP cluster broadcast a same beacon signal synchronously, these same beacon signals broadcasted by the APs will overlay each other during propagation to form an overlaid beacon signal, also referred to as clustered beacon signal. The clustered beacon signal is received by the receiving unit 910 as the candidate beacon signal transmitted from this AP cluster. In the same way, the receiving unit 910 may receive respective candidate beacon signals transmitted from other AP clusters.

The selecting unit 920 of the communication device 900 selects one or more beacon signals from the plurality of candidate beacon signals. In an embodiment, the selecting unit 920 may select the one or more beacon signals based on the reception quality of the plurality of candidate beacon signals. For example, the selecting unit 920 may check the signal strength of the candidate beacon signals. The stronger the signal strength is, the better the reception quality is. In this way, the selecting unit 920 may select a beacon signal with the highest reception quality. Then, the communication device 900 will send the random access request to the AP cluster having broadcasted this selected beacon signal. For example, the communication device 900 may retrieve the identification of the AP cluster and random access configuration information specific to this AP cluster, create a random access request based on the random access configuration information, the random access request contains the identification of the AP cluster, and send the random access request to the AP cluster, more specifically, the APs of the AP cluster.

In addition, it is likely that the AP cluster having broadcast the selected beacon signal doesn't respond to the communication device's access request (for example, all the APs in the AP cluster shut down). In this case, the selecting unit 920 may select more than one beacon signals from the candidate beacon signals, and then the communication device 900 sends the random access request to the different sources having broadcasted the selected more than one beacon signals.

Furthermore, all the APs in the plurality of AP clusters may employ the beamforming antenna to broadcast the beacon signal over beams directed to different directions. In this case, each of the plurality of APs within a same AP cluster has a plurality of beams, a same beacon signal is broadcast synchronously by the plurality of APs within the same AP cluster over their beams having a same beam identification, and each of the plurality of candidate beacon signals further contains an identification the beam utilized to transmitting the candidate beacon signals. As such, an AP cluster may broadcast different candidate beacon signals through different beams, these candidate beacon signals have the same AP cluster identification, but different beam identification. For example, the communication may receive two candidate beacon signals. The first candidate beacon signal is transmitted from the AP cluster 1 through the beam 1, the second candidate beacon signal is transmitted from the AP cluster 1 through the beam 2.

Due to the introduction of the beams, the random access request will be directed to the specific beam of the AP cluster instead of the AP cluster. In an embodiment, the communication device 900 may retrieve the identification of the AP cluster, the identification of the beam, and random access configuration information specific to the beam of the AP cluster, then create a random access request based on the random access configuration information, the random access request contains the identification of the AP cluster and the identification of the beam, and finally send the random access request directed to a specific beam to the AP cluster.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method in an access point (AP) for broadcasting a beacon signal in a high frequency radio communication network, comprising:
   joining an AP cluster in the high frequency radio communication network, the AP cluster containing two or more APs, wherein each AP in the AP cluster has a plurality of beams directed to different directions and wherein respective beams of each AP have respective same beam identification; and
   broadcasting synchronously a same beacon signal on a beam of the AP together with corresponding beams of APs in the AP cluster having a same beam identification as the beam of the AP, the broadcasted same beacon signal containing the beam identification and an identification of the AP cluster.

2. The method of claim 1, wherein the joining comprising:
   joining the AP cluster whose distance from the AP is shorter than a threshold distance;
   joining the AP cluster whose overlapping coverage with the AP is larger than a threshold area; or
   creating a new AP cluster and joining the new cluster.

3. The method of claim 1, wherein the method further comprises lowering modulation and coding rate of the same beacon signal.

4. The method of claim 1, wherein said beams having the same beam identification are directed to a substantially same direction.

5. The method of claim 1, wherein for said each AP in the AP cluster, all beams of said each AP are utilized to broadcast beacon signals within a beacon transmission interval.

6. The method of claim 1, wherein for said each AP in the AP cluster, a first subset of all beams of said each AP are utilized to broadcast beacon signals within a first beacon transmission interval, and a second subset of all beams of said each AP are utilized to broadcast beacon signals within a second beacon transmission interval.

7. The method of claim 1, wherein the method further comprises:
receiving an access request directed to the AP cluster from a communication device, and
coordinating with other APs in the AP cluster to select one of the APs in the AP cluster to respond to the communication device.

8. A method in a communication device for deriving a beacon signal in a high frequency radio communication network, comprising:
receiving a plurality of candidate beacon signals from one or more access point (AP) clusters, each of the one or more AP clusters comprising a plurality of APs, wherein each AP of the plurality of APs within a same AP cluster has a plurality of beams directed to different directions, wherein respective beams of each AP of the plurality of APs within the same AP cluster having respective same beam identification, wherein each AP of the plurality of APs within the same AP cluster broadcasting synchronously a same beacon signal on corresponding beams having a same beam identification, and wherein the same beacon signal containing the beam identification and an identification of the AP cluster; and
selecting one or more same beacon signals from the plurality of candidate beacon signals.

9. The method of claim 8, wherein the selecting comprises selecting the one or more same beacon signals based on a reception quality of the plurality of candidate beacon signals.

10. The method of claim 8, wherein the method further comprises:
retrieving the identification of the AP cluster from the selected beacon signal; and
sending an access request to the AP cluster based on the identification of the AP cluster.

11. The method of claim 8, wherein the method further comprises:
retrieving the identification of the AP cluster and the same beam identification from the selected beacon signal; and
sending an access request to the associated AP cluster based on the identification of the AP cluster and the same beam identification.

12. An access point (AP) configured to broadcast a beacon signal in a high frequency radio communication network, comprising:
a processor; and
a memory containing instructions which, when executed by the processor, cause the AP to:
join an AP cluster in the high frequency radio communication network, the AP cluster containing two or more APs, wherein each AP in the AP cluster has a plurality of beams directed to different directions and wherein respective beams of each AP have respective same beam identification; and
broadcast synchronously a same beacon signal on a beam of the AP together with corresponding beams of APs in the AP cluster having a same beam identification as the beam of the AP, the broadcasted same beacon signal containing the beam identification and an identification of the AP cluster.

13. The AP of claim 12, wherein the AP is further configured to lower modulation and coding rate of the same beacon signal.

14. A communication device configured to derive a beacon signal in a high frequency radio communication network, comprising:
a processor; and
a memory containing instructions which, when executed by the processor, cause the communication device to:
receive a plurality of candidate beacon signals from one or more access point (AP) clusters, each of the one or more AP clusters comprising a plurality of APs, wherein each AP of the plurality of APs within a same AP cluster has a plurality of beams directed to different directions, wherein respective beams of each AP of the plurality of APs within the same AP cluster having respective same beam identification, wherein each AP of the plurality of APs within the same AP cluster broadcasting synchronously a same beacon signal on corresponding beams having a same beam identification, and wherein the same beacon signal containing the beam identification and an identification of the AP cluster; and
select one or more same beacon signals from the plurality of candidate beacon signals.

15. The communication device of claim 14, wherein the communication device is a user equipment.

16. A non-transitory computer readable storage medium having stored there on instructions which, when run on a processor of an access point (AP), cause the AP to perform operations comprising:
joining an AP cluster in a high frequency radio communication network, the AP cluster containing two or more APs, wherein each AP in the AP cluster has a plurality of beams directed to different directions and wherein respective beams of each AP have respective same beam identification; and
broadcasting synchronously a same beacon signal on a beam of the AP together with corresponding beams of APs in the AP cluster having a same beam identification as the beam of the AP, the broadcasted same beacon signal containing the beam identification and an identification of the AP cluster.

17. The non-transitory computer readable storage medium according to claim 16, wherein the instructions further cause the AP to perform operations comprising:
joining the AP cluster whose distance from the AP is shorter than a threshold distance;
joining the AP cluster whose overlapping coverage with the AP is larger than a threshold area; or
creating a new AP cluster and joining the new cluster.

18. The non-transitory computer readable storage medium according to claim 16, wherein the instructions further cause the AP to perform operations comprising:
lowering modulation and coding rate to provide the same beacon signal with each AP in the AP cluster.

19. The non-transitory computer readable storage medium according to claim 16, wherein the instructions further cause the AP to perform operations comprising:
directing the plurality of beams in a substantially same direction with each AP in the AP cluster for beams having the same beam identification.

20. The non-transitory computer readable storage medium according to claim 16, wherein the instructions further cause the AP to perform operations comprising:

broadcasting beacon signals for all beams within a beacon transmission interval with each AP in the AP cluster.

21. The non-transitory computer readable storage medium according to claim 16, wherein the instructions further cause the AP to perform operations comprising:
broadcasting beacon signals with each AP in the AP cluster, a first subset of all beams within a first beacon transmission interval, and broadcasting a second subset of all beams within a second beacon transmission interval.

22. The non-transitory computer readable storage medium according to claim 16, wherein the instructions further cause the AP to perform operations further comprising:
receiving an access request directed to the AP cluster from a communication device, and
coordinating with each other AP in the AP cluster to select one of the APs in the AP cluster to respond to the communication device.

23. A non-transitory computer readable storage medium having stored there on instructions which, when run on a processor of a communication device, cause the communication device to perform operations comprising:
receiving a plurality of candidate beacon signals from one or more access point (AP) clusters, each of the one or more AP clusters comprising a plurality of APs, wherein each AP of the plurality of APs within a same AP cluster has a plurality of beams directed to different directions, wherein respective beams of each AP of the plurality of APs within the same AP cluster having respective same beam identification, wherein each AP of the plurality of APs within the same AP cluster broadcasting synchronously a same beacon signal on corresponding beams having a same beam identification, and wherein the same beacon signal containing the beam identification and an identification of the AP cluster; and
selecting one or more same beacon signals from the plurality of candidate beacon signals.

24. The non-transitory computer readable storage medium according to claim 23, wherein the instructions further cause the communication device to perform operations comprising:
selecting the one or more same beacon signals based on a reception quality of the plurality of the candidate beacon signals.

25. The non-transitory computer readable storage medium according to claim 23, wherein the instructions further cause the communication device to perform operations comprising:
retrieving the identification of the AP cluster from the selected beacon signal; and
sending an access request to the AP cluster based on the identification of the AP cluster.

26. The non-transitory computer readable storage medium according to claim 23, wherein the instructions further cause the communication device to perform operations comprising:
retrieving the identification of the AP cluster and the same beam identification from the selected beacon signal; and
sending an access request to the AP cluster based on the identification of the AP cluster and the same beam identification.

* * * * *